United States Patent Office 3,508,240
Patented Apr. 21, 1970

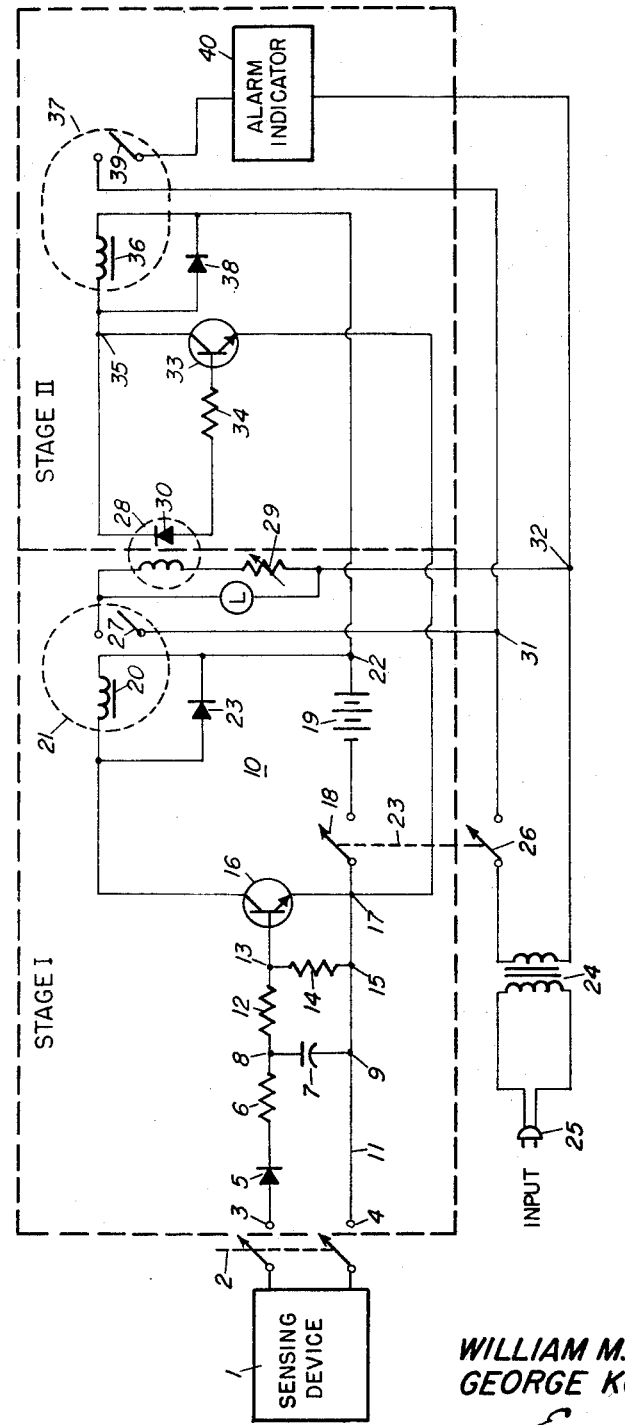

---

3,508,240
ANNUNCIATOR SYSTEM
William M. Rabenstein, Alamosa, Colo., and George Kojima, Hawaii National Park, Hawaii, assignors to the United States of America as represented by the Secretary of the Interior
Filed Oct. 24, 1968, Ser. No. 770,210
Int. Cl. G08b 21/00
U.S. Cl. 340—261       2 Claims

ABSTRACT OF THE DISCLOSURE

The output signal of a seismograph sensing device is fed into a two stage annunciator circuit. The signal activates a first stage heater coil in the thermal environment of a second stage reverse biased diode. A seismograph signal of prolonged duration is indicative of imminent volcanic activity. Such a signal raises the diode to the reverse breakdown temperature at which the diode becomes conductive in the cathode to anode direction, activating an alarm.

---

This invention resulted from work done by the National Park Service of the Department of the Interior, and the domestic title to the invention is in the Government.

BACKGROUND OF THE INVENTION

This invention relates broadly to electrical discriminating circuitry which is selectively responsive to stimuli exceeding a minimum duration, and more specifically to annunciator systems in which a time delay circuit measures the duration of a transducer output to differentiate spurious signals from alarm signals. This invention also relates more specifically to a method and device for predicting and announcing imminent volcanic activity by monitoring the duration of seismic signal groupings.

In a volcanic environment minor earthquakes are a frequent daily occurrence of little immediate scientific interest. Harmonic tremor and earthquake swarms, however, while infrequent, are of immediate interest as an indication of imminent volcanic eruption. Harmonic tremor is a grouping of seismic events arising from the flowing movement of molten rock, or magma, deep in the earth. Earthquake swarms are tremor groupings occurring at least one a minute for an extended period.

Previous differentiation of short lived minor earthquakes from prolonged harmonic tremor and earthquake swarms was accomplished by individual appraisal of specific seismic events as they occurred. This tedious and costly appraisal required constant surveillance of seismograph recording equipment by trained technicians. Significant seismic events often escaped timely detection for lack of constant surveillance. There was no method or device available for automatically performing this surveillance.

One aspect of the present invention is based upon the recognition that seismic events can be automatically differentiated by measuring their duration. Harmonic tremor and earthquake swarms become significant when they last for several minutes or longer. Automatic surveillance of these phenomena requires an apparatus capable of measuring the duration of groupings of seismic events and activating an alarm only when groupings of prolonged duration are measured.

Prior art annunciator systems have been provided for eliminating the effects of transient impulses upon an alarm circuit. A common solution employs an RC delay circuit insensitive to a single transient voltage pulse. A capacitor is placed across the input of a detection device and a resistor placed in series with the detection device. Using a high RC time constant, a short transient signal fails to charge the capacitor sufficiently to activate the detection device. An alarm signal, however, charges the capacitor sufficiently to activate the detection device. Such a system works only for transients of extremely short duration. Repetitive closely spaced transient pulses and single longer transient pulses simulate an alarm condition, charging the capacitor which activates the detection device.

Annunciator devices of this type are not adaptable to the detection of harmonic tremor and earthquake swarms. Even minor earthquakes are of sufficient duration to charge the capacitor, sounding the alarm. The prior art was concerned with differentiating two entirely different types of signals, that is, very short transient pulses and steady state alarm signals. The present invention is concerned with differentiating similar signals which differ only in duration, a relatively prolonged duration which exceeds the limits of a capacitor charging system.

In another prior art annunciator system transient pulses are distinguished from an alarm signal by the use of gated clock logic. Activation of the alarm is dependent upon the presence of an alarm signal for a period of two consecutive clock pulses from a clock generator, the pulses from the clock generator being spaced in time for a period greater than the length of the transient signals. This device requires elaborate electronic circuitry and is, again, incapable of differentiating signals of relatively prolonged duration.

An alternative timing circuit available in the prior art provided a continuously conducting thermistor in series with a relay switch and battery. Self-heating gradually decreased the resistance of the thermistor, increasing the current conducted in the circuit and closing the relay. This timing circuit presented several disadvantages. Heating time could not be adjusted without affecting the current available to operate the relay. Delays longer than a few seconds were not practical. And, since the thermistor was always conductive, a current continuously tended to activate the relay, the activation of which was dependent upon the relative magnitudes of the forces generated by the relay solenoid and the relay biasing spring. This continuous contest of variable electrical and mechanical elements made precision timing difficult.

SUMMARY OF THE INVENTION

The present invention provides a two stage discriminating circuit capable of monitoring the duration of seismic signals. Application of the circuit is made in differentiating minor tremors from more significant earthquake activity. Time discrimination is accomplished by a two stage circuit which introduces a time lag between the initiation of seismograph voltage output and the subsequent sounding of an alarm. The first stage of the circuit includes a heater coil activated when a seismograph signal indicates earthquake activity. The second stage includes a reverse biased diode in the thermal environment of the heater coil. When an input signal of sufficient duration is received from the seismograph sensing device, the heater coil raises the diode to the reverse breakdown temperature, causing the diode to conduct electric current in the normally blocked cathode to anode direction. The heated diode acts as an instantaneous switch, turning on a transistor which then activates an alarm circuit or other warning device.

Accordingly, it is an object of the present invention to provide a method and device for warning of imminent volcanic activity by distinguishing minor earthquakes from harmonic tremor and earthquake swarms.

It is a further object of this invention to provide a two stage annunciator circuit which is selectively sensitive to the duration of an input signal.

It is still further object of this invention to provide a delay circuit in which a time lag is introduced by the heating of a diode to the reverse breakdown temperature.

It is a still further object of this invention to provide a heated diode as a time sensitive instantaneous switch.

These and other objects of the invention will become more fully apparent with reference to the following specification and drawing which describe the preferred embodiment of the invention.

BRIEF DESCRIPTION OF THE DRAWING

The sole figure illustrates one embodiment of a two stage annunciator switching circuit in accordance with the present invention.

DESCRIPTION OF THE PREFERRED EMBODIMENT

Referring now to the sole figure, one embodiment of an annunciator discriminating circuit 10 will now be described in detail.

A two stage time discriminating circuit 10 is shown in which stage I provides a warning of a near-alarm condition by turning on a light bulb L, while simultaneously activating a heater coil 28. The heater coil 28 provides a thermal output which is integrated to measure the duration of the near-alarm condition. In stage II a reverse biased diode 30 in the thermal environment of the heater 28 acts as an integrator by absorbing heat generated by the heater 28. When the heating continues for a design established time sufficient to reach the reverse breakdown temperature of the diode, a relay 37 is activated, switching on an alarm indicator 40.

An electrical sensing device 1 is remvably connected by contacts 2 to input terminals 3 and 4 of an RC input network of discriminating circuit 10. The anode terminal of a diode 5 is connected to input terminal 3 while the cathode terminal is connected to one end of a resistor 6 in series with the diode. A capacitor 7 is joined at terminal 8 to the other end of resistor 6 and at terminal 9 to input terminal 4, through common input 11. Series resistors 12 and 14 are connected at terminal 8 and terminal 15 of common lead 11, respectively, in parallel with capacitor 7.

When the electrical output voltage of sensing device 1, applied to input terminals 3 and 4, is positive at terminal 3, a current will be conducted through diode 5 charging capacitor 7 and establishing a positive voltage between terminals 8 and 9. Momentary storage of charge on capacitor 7 enables a smoothing of periodic or pulsating input voltages from sensing device 1 and stabilizes the average voltage cross resistors 12 and 14. Diode 5 serves as a half-wave rectifier while preventing discharge of the capacitor 7 through resistor 6 and the electrical circuit (not shown) of the input device.

The base of an NPN transistor 16 is connected to a terminal 13 between resistors 12 and 14. The emitter of transistor 16 is connected to terminal 17 of common lead 11 in the common emitter mode of operation. The negative terminal of a supply battery 19 is connected to terminal 17 through a single pole 18 of a double pole on-off switch 23. The solenoid 20 of a normally open relay 21 is connected at one end to the positive terminal 22 of supply battery 19 and at the other end to the collector of transistor 16. A diode 23 is similarly connected between transistor 16 and battery 19 in parallel with solenoid 20, the cathode of the diode being connected to terminal 22 and the anode to the collector of transistor 16.

Transistor 16 acts as a switch, activating relay 21 when on-off switch 18 is closed and the input from sensing device 1 generates sufficient biasing voltage across resistor 14 to activate transistor 16. The biasing voltage of resistor 14 activates transistor 16 when the base-emitter voltage exceeds a minimum design value, characteristic of transistor 16. This minimum value is chosen to exceed the voltage generated across resistor 14 when no external stimulus is applied to sensing device 1 in a steady state condition. Such a steady state voltage is used, for instance, where a reference output from a sensing device is provided to establish a detectable reference base from which deviation measurements are taken.

The high voltage terminals of an AC stepdown transformer 24 are connected to an AC voltage (not shown) through input terminals 25. Relay switch 27 of relay 21 is connected to the low voltage terminals of the transformer 24 in series with a heater coil 28 and a variable resistor 29 through the other pole 26 of switch 23 at terminals 31 and 32. A light bulb L is connected in parallel with the heater 28 and resistor 29 between relay switch 27 and terminal 32.

When transistor 16 is activated, solenoid 20 closes relay switch 27. The resulting current flow, when switch 23 is closed, turns on lamp L and heater coil 28 in stage I of the delay circuit. Lamp L indicates that stage I of the circuit has been activated and that heater coil 28 is heating diode 30, which acts as an integrating switch in stage II of the device. Variable resistor 29 is used to adjust the current in heater 28, thereby varying the heat intensity generated.

When the output of sensing device 1 maintains sufficient continuous biasing potential across biasing resistor 14, relay 21 remains closed and heater 28 continues to heat diode 20. Removal of the stimulus from sensing device 1 causes normally opened relay 21 to assume an open position, turning off lamp L and heater 28.

When relay switch 27 returns to the normally open position, displacement of the magnetic core past the coil in solenoid 20 generates a transient voltage spike. Diode 23 is provided as an open circuit path for dissipation of this spike, protecting transistor 16 from the harmful effects of an overload.

In stage II of the circuit 10 a second NPN transistor 33 is connected in the common emitter mode to terminal 17 of input lead 11. The base of transistor 33 is connected through series biasing resistor 34 to the anode of diode 30. The cathode of diode 30 is connected to the collector of transistor 33 at terminal 35.

Solenoid 36 of a relay 37, and a diode 38 are connected in parallel between collector terminal 35 and battery terminal 22 with the anode of the diode 38 connected at terminal 35 and the cathode at terminal 22. Relay switch 39 in series with alarm indicator 40 is connected at terminals 31 and 32 to the low voltage output of AC transformer 25.

When stage I of the device is activated, heater 28 begins to heat diode 30. In normal operation diode 30 acts as an open circuit between supply voltage 19 and the base of transistor 33. When the heater 28 is energized, diode 30, located in the thermal environment of the heater, absorbs heat and the temperature of the diode rises. When the reverse breakdown temperature of diode 30 is reached, the diode becomes conductive in the normally block cathode to anode direction. The critical temperature point at which diode 30 becomes conductive is a design characteristic of the diode. The amount of time required for the diode to reach the critical temperature is dependent upon the physical relationship of the diode and the heater, and upon the heater current, variable by adjustment of resistor 29.

When diode 30 becomes conductive, the positive voltage of supply battery 19 is applied across the base and emitter of transistor 33. This positive bias activates transistor 33, switching relay solenoid 36 in series with battery 19. When transistor 33 becomes conductive a back bias appears across resistor 34. Current splitting at collector terminal 35 holds the back bias to a value below the supply voltage so that sufficient bias voltage remains to keep transistor 33 activated. The solenoid then activates relay switch 39 closing the alarm circuit. Alarm indicator 40 remains energized until relay 37 is manually switched to off position, providing a continuous indication of the alarm condition.

When the output of heater 28 is insufficient to hold diode 30 above the critical breakdown temperature, the diode becomes nonconductive in the reverse direction and transistor 33 is deactivated. Alarm indicator 40 continues to sound, however, until relay switch 39 is manually opened.

Diode 38 provides the same protective function as that described above for diode 23, serving to isolate transistor 33 from transient voltage spikes when relay switch 37 is opened.

In one exemplary form of the invention, the circuit parameters were as follows: Diodes 5, 23 and 38 were 1N302 silicon diodes. Transistors 16 and 33 were 2N336 NPN silicon transistors. Diode 30 was a 2N525 PNP germanium transistor in which the emitter and collector terminals were used as the anode and cathode, respectively. Resistors 6, 12 and 34 were 2.2K ohms while resistor 14 and solenoid coils 20 and 36 were 10K ohms. Heater coil 28 was 6 ohms. Capacitor 7 was 500 microfarads. Supply battery 19 was 22.5 volts and an AC input of 115 volts stepped down by transformer 24 to 6.3 volts at 1 ampere was used. A seismograph recording held generating ½ volt at steady state was used as a sensing device 1.

Using the above circuit parameters, the disclosed delay circuit was used to differentiate frequent minor earthquakes from the more important harmonic tremor and earthquake swarms, sounding an alarm only when the latter two were recieved over the seismograph used as a sensing device 1.

Absent earthquake activity the ½ volt generated by the seismograph produced no effect upon the discriminating circuit. When harmonic tremor, earthquakes, or earthquake swarms were received the seismograph voltage increased to the range of 4–16 volts AC, depending upon intensity of the tremors. This voltage activated the stage I relay 21 which, in turn, activated the diode heater 28. If only an earthquake of short duration was being detected the input voltage soon fell below the 4 volts required to maintain sufficient bias to hold transistor 16 conductive. The stage I relay 21 then opened, turning off the indicator lamp L and allowing the heater 28 to cool. Since earthquakes of short duration are of little immediate scientific interest in the detection of volcanic eruptions the disclosed discriminating circuit 10 prevented an unnecessary sounding of alarm indicator 40 and obviated an individual investigation of each minor earthquake.

If harmonic tremor or earthquake swarms were being received, however, the 4 or more volts continued to hold the stage I relay 21 closed, and to energize the heater coil 28 that in turn heated the diode 30 in stage II. With variable resistor 29 set at 2.5 ohms, a 3 minute and 20 second time delay elapsed before the reverse breakdown temperature of diode 30 was reached and transistor 33 was activated, closing the alarm circuit. Thus, only detected signals of major tremor groupings—harmonic tremor and earthquake swarms—activated the alarm indicator 40, warning of an imminent volcanic eruption while minor signals were ignored.

It can thus be seen that a useful method and device for predicting volcanic eruptions by measuring the duration of seismic signals in a variable duration time delay circuit has been provided.

In adapting the present exemplary disclosure to a particular time delay environment, numerous modifications within the scope of the invention will become apparent to those skilled in the art.

For example, in an annunciator system, the sensing device 1 could be a photo-electric cell, a thermal detector, or similar sensor rather than a seismograph recording head. The discriminating circuit could be adapted to any environment in which a predictable delay is required, with a variety of possible inputs and outputs.

Alarm indicator 40 could be a light, a buzzer, or a feed-back control circuit directly connected to transistor 33 and functioning to regulate the input stimulus to sensing device 1, or initiating a further step in a process after a measured delay.

Relay 37 could be replaced by a normally open or normally closed relay. If normally closed it could be used to deactivate a control circuit in series with alarm indicator 40 after a measured duration of a condition endangering the control circuit.

Variable resistor 29 could be replaced by a fixed resistance, and time delay variation controlled, for example, by adjustable spacing between the diode 30 and the heater 28, or by introducing an adjustable heat sink between the heater and diode.

Other modifications will become apparent to those skilled in the art in the light of the above teachings and within the scope of the appended claims.

What is claimed is:

1. A discriminating system selectively responsive to input stimuli exceeding a predetermined duration comprising:
   a seismograph sensing device for sensing a condition external to said system and providing an input stimulus,
   heater means responsive to said input stimulus for generating a thermal output for the duration of said input stimulus,
   semiconductor means having a temperature dependent conductivity threshold, situated in the thermal environment of the heater means and cumulatively responsive to said thermal output for conducting a current only after a predetermined minimum duration of said thermal output, and
   circuit means activated by said semiconductor means in response to a stimulus exceeding said predetermined minimum duration.

2. The system as described in claim 1 in which said circuit means is a warning device.

References Cited

UNITED STATES PATENTS 3,261,009  7/1966  Stetten et al. _____ 340—261
3,334,278  8/1967  Atkins et al. _____ 307—310

RODNEY BENNETT, Jr., Primary Examiner

C. E. WANDS, Assistant Examiner

U.S. Cl. X.R.

307—310; 340—15